United States Patent [19]

Claassen

[11] Patent Number: 4,724,983

[45] Date of Patent: Feb. 16, 1988

[54] APPARATUS FOR LIQUEFYING A THERMOPLASTIC PLASTIC

[76] Inventor: Henning J. Claassen, Industriegebiet Hafen, 2120 Lüneburg, Fed. Rep. of Germany

[21] Appl. No.: 945,707

[22] Filed: Dec. 23, 1986

[30] Foreign Application Priority Data

Jan. 2, 1986 [DE] Fed. Rep. of Germany ....... 3600020

[51] Int. Cl.⁴ .............................................. B67D 5/62
[52] U.S. Cl. ................................. 222/146.5; 222/372; 264/177.19; 264/177.2; 425/145; 425/378 R
[58] Field of Search .................... 264/177.19, 177.21, 264/211.19, 221.22; 425/72.5, 145, 378; 222/1, 372, 146.2, 146.5

[56] References Cited

U.S. PATENT DOCUMENTS 4,308,447 12/1981 Notzold et al. ............... 222/146.5 X
4,641,764 2/1987 Faulkner ........................ 222/146.2

FOREIGN PATENT DOCUMENTS 2836545 11/1984 Fed. Rep. of Germany .

*Primary Examiner*—Charles Hart
*Attorney, Agent, or Firm*—Armstrong, Nikaido, Marmelstein & Kubovcik

[57] ABSTRACT

An apparatus for liquefying a thermoplastic plastic, in particular an adhesive on the basis of polyurethane, comprises a supply container for the thermoplastic plastic, a heating means for heating the thermoplastic plastic disposed in the supply container and a collecting trough for the liquefied plastic disposed beneath the supply container, from which trough the plastic is supplied to the further processing. The heatable supply container includes an upper portion for receiving a downwardly open transport container for the thermoplastic plastic and a lower portion serving as buffer volume. The heated plastic flows out of the transport container downwardly through the buffer volume into the collecting trough.

13 Claims, 1 Drawing Figure

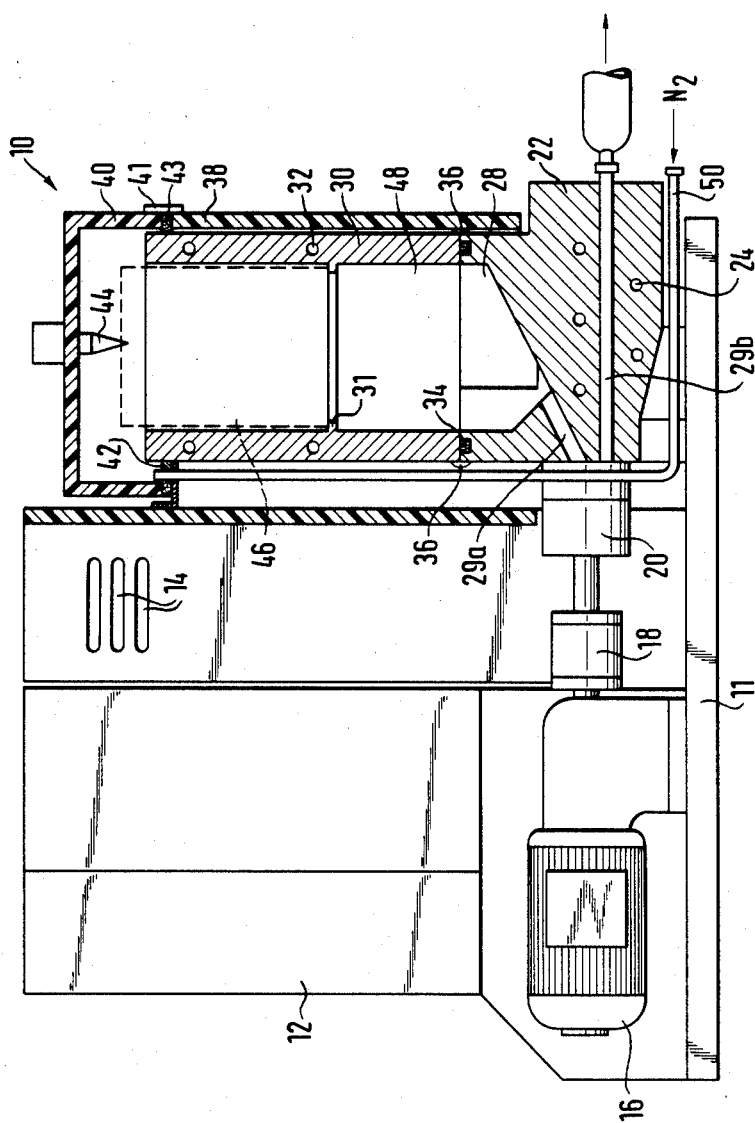

APPARATUS FOR LIQUEFYING A THERMOPLASTIC PLASTIC

BACKGROUND OF THE INVENTION

1. Field of the Invention

The invention relates to an apparatus for liquefying a thermoplastic plastic, in particular an adhesive on the basis of polyurethane.

2. Description of the Prior Art

Such a liquefying apparatus is known from DE-PS No. 2,836,545 and comprises a supply container for the thermoplastic plastic, a heating means for heating the plastic disposed in the supply container and a collecting trough for the liquefied plastic disposed beneath the supply container; from the collecting trough the liquefied plastic is supplied for example by means of a metering pump to an applicator head.

This liquefying apparatus is adapted in particular to processing hot-melt adhesive which is present in the form of a granulate, i.e. the starting granulate can easily be introduced from above into the supply container, heated and thereby liquefied and thereafter processed.

Problems occur when liquefying poorly flowing highly viscous thermoplastic plastics, that is highly viscous sealing compositions, butylene or bonding hot-melt adhesives, in particular adhesives on the basis of polyurethane, because such poorly flowing highly viscous masses cannot readily be poured from above into the supply container.

So-called "drum melters" have therefore been developed, i.e. heating means which are introduced into the opened transport container for such a thermoplastic plastic and heat the highly viscous mass so that it becomes flowable.

However, it is not possible to use such a drum melter to process thermoplastic plastics which react very rapidly with the oxygen present in the air and in particular harden. This applies very much to adhesives on the basis of polyurethane so that when processing such compositions with a conventional drum melter problems are continuously encountered.

SUMMARY OF THE INVENTION

The invention is thus based on the problem of providing an apparatus for liquefying a thermoplastic plastic, in particular an adhesive on the basis of polyurethane, of the type indicated in which the aforementioned disadvantages do not occur.

In particular a liquefying apparatus is proposed with which even highly sensitive highly viscous masses readily reacting in the presence of air can be liquefied.

Therefore the invention proposes an apparatus for liquefying a thermoplastic plastic, in particular an adhesive on the basis of polyurethane, comprising a supply container for the thermoplastic plastic, a heating means for heating the thermoplastic plastic disposed in the supply container and a collecting trough for the liquefied thermoplastic plastic disposed beneath the supply container, wherein the heatable supply container comprises an upper portion for receiving a downwardly open transport container for the thermoplastic plastic and a lower portion serving as buffer volume.

Expedient embodiments are defined by the features of the subsidiary claims.

The advantages achieved with the invention are based on the following mode of operation:

The conventional generally can-shaped or drum-shaped transport container for the thermoplastic plastic, in particular an adhesive on the basis of polyurethane, is opened and then inserted from above with the opening pointing downwardly into the supply container of the liquefying apparatus. For this purpose the inner wall of the supply container can be provided with an annular encircling web on which the lower edge of the transport container rests.

The supply container is then closed by means of a pivotally mounted cover, the tip of a mandrel penetrating from above into the now upwardly directed bottom of the transport container to support the flowing out.

Finally, a source for an inert gas, in particular nitrogen, is opened so that the gas penetrates into the interior of the supply container and shields the transport container against the entry of air.

At critical points, that is the gaps between the supply container and cover and between the collecting trough and supply container, seals are provided which serve both for thermal insulation and for sealing against the entry of air or exit of the inert gas.

The resistance heating elements which are disposed in the walls of the supply container are now supplied with electric current so that the walls of the supply container and thus the mass disposed in the transport container are heated. With increasing temperature the flowability of the thermoplastic plastic increases so that finally it flows downwardly out of the opened transport container into a buffer volume which is disposed directly beneath the transport container.

From here the now liquefied thermoplastic plastic passes to the collecting trough which is disposed beneath the supply container and is also heated. The collecting trough has its own heating means which can be controlled independently of the heating of the supply container so that the supply container on the one hand and collecting trough on the other can be set to different temperatures.

The lower part of the supply container beneath the transport container serves as buffer volume and can receive an amount of plastic corresponding to the volume of the largest transport container to be handled. This makes it possible when the buffer volume is full to open the cover of the supply container, take out the emptied transport container and insert a new full transport container so that the operations can be carried out practically continuously. The "gas hood" screens the sensitive, i.e. very reactive, surface of the heated thermoplastic plastic from the ambient air.

From the collecting trough the heated and thus liquefied thermoplastic plastic flows via a passage to a metering pump, in particular a gear-type pump, which supplies it to the further processing.

The supply container rests detachably on the lower part with the collecting trough so that it can be interchanged and thus adapted to different transport container volumes. The transport container and also a portion of the lower part with the collecting trough are preferably surrounded by a heat-protection hood serving as additional thermal insulation.

BRIEF DESCRIPTION OF THE DRAWINGS

The invention will be explained hereinafter in detail with the aid of an example of embodiment with reference to the enclosed schematic drawing, the single FIGURE of which shows a vertical section through an apparatus for liquefying an adhesive on the basis of polyurethane.

DESCRIPTION OF THE PREFERRED EMBODIMENT

The liquefying apparatus denoted generally by the reference numeral 10 comprises a base plate 11 which is provided with an electric motor 16, a switch cabinet 12 which accommodates the electrical switch elements for controlling the temperature at the various heating elements, is provided with ventilating slots 14, and on the right side of the illustration in the FIGURE carries the actual liquefying part. The electric motor 16 via a coupling, in particular a magnetic coupling, or a gearing, generally a reduction gearing, designated by the reference numeral 18, drives a pump 20, generally a gear-type pump, for conveying the heated and thus liquefied polyurethane adhesive.

The actual liquefying part is disposed in a heat-protection hood 38 which also screens the sensitive electronic components of the switching cabinet 12 and is sealed at its upper end by a pivotally mounted cover 40. For sealing the gap between the cover 40 and the lower region of the liquefying part seals 40 and 42 are provided. Moreover, a schematically indicated latch means 41 holds the cover 40 in its operating position shown in the FIGURE.

The actual liquefying part comprises a block-shaped substructure 22 with heating bores 24 in which for example electrical resistance heaters are disposed which are insulated by means of chamotte tubes.

At its upper end the block 22 comprises a recess 28 formed as collecting trough which is connected via a passage 29a to the pump 20. From the pump 20 a further portion 29b of the conveying passage leads to the outlet for the liquefied adhesive.

By brackets 36 the actual supply container 30 is detachably secured on the block 22 and the walls of said container 30 are likewise provided with heating bores 32 in which for example electrical resistance heating elements insulated by means of chamotte tubes are disposed.

Between the upper edge of the walls of the block 22 in the region of the recess 28 and the lower edge of the walls of the supply container 30 seals 34 are provided, in particular insulations on the basis of mineral fibres, expediently asbestos.

As is apparent from the FIGURE the two upper seals 40 and 42 bear on the outer wall of the upwardly open supply container 30.

The supply container 30 comprises two parts, that is a lower buffer volume 48 and an upper part which is separated from the lower part 48 by a narrow encircling web 31 projecting inwardly from the inner wall thereof. Resting on this web is the lower edge of a downwardly open transport container 46 for the adhesive which is indicated in the FIGURE in dashed lines.

Finally, the inner edge of the cover 40 is provided with a downwardly projecting pointed mandrel 44 whose tip penetrates into the upwardly directed bottom face of the transport container 46.

A conduit 50 for an inert gas, in particular nitrogen, extends through beneath the block 22 and then laterally past the supply container 30 upwardly and opens into the cavity which is formed between the upper end of the supply container 30 and the cover 40.

When the operation is started the cover 40 is opened and a transport container 46 for the adhesive on the basis of polyurethane, which is open at one side, is introduced into the supply container 30 with the opening downwards so that the lower edge of the transport container 46 comes to rest on the encircling web 31. The adhesive on the basis of polyurethane is so viscous that it cannot flow out of the downwardly opened transport container 46.

The cover 46 is then closed so that the tip of the mandrel 44 penetrates from above into the transport container 46. At the same time the gap between the cover 40 on the one hand and the heat-protection hood 38 or the supply container 30 on the other hand is sealed by means of the seals 40, 42. Nitrogen is then supplied via the conduit 50 so that the air is expelled from the supply container and the collecting trough, i.e. the adhesive can no longer come into direct contact with the ambient air.

The two independently controllable heating devices for the block 22 on the one hand and the supply container 30 on the other are now switched on. As a result the adhesive in the transport container 46 liquefies and then flows out of said container 46 downwardly into the buffer volume 48. Said buffer volume 48 is so dimensioned that it suffices to accommodate an amount of adhesive corresponding to the largest transport container volume to be handled. The liquefied adhesive then passes from the buffer volume 48 over the recess 28 serving as collecting trough and the passage 29a to the pump 20 which supplies the liquefied adhesive via the passage 29b to the outlet.

When the transport container 46 has been completely emptied the cover 40 is opened again, the empty transport container 46 removed and a new full transport container 46 inserted. The processing be carried out simultaneously because liquefied adhesive is still in the buffer volume 48; at the top towards the ambient air this heated and thus particularly reactive adhesive is shielded by the nitrogen hood so that a continuous operation is possible without any impairment of the properties of the heated adhesive in the buffer volume 48.

Since the heatable supply container 30 is secured detachably to the block 22 with the collecting trough 28 it can easily adapt itself to different processing volumes and thus transport container volumes by for example replacing the hollow cylindrical or cuboid supply container 30 by another embodiment of corresponding volume.

The temperature in the block 22 on the one hand and the supply container 30 on the other are kept to a settable desired constant value by means of the usual thermostat devices and corresponding temperature sensors, which are not shown. The corresponding electronic components are disposed in the switching cabinet 12.

I claim:
1. An apparatus for liquefying a thermoplastic plastic, in particular an adhesive on the basis of polyurethane, comprising
    (a) a supply container for the thermoplastic plastic,
    (b) a heating means for heating the thermoplastic plastic disposed in the supply container and
    (c) a collecting trough for the liquefied thermoplastic plastic disposed beneath the supply container, wherein
    (d) the heatable supply container comprises an upper portion for receiving a downwardly open transport container for the thermoplastic plastic and a lower portion serving as buffer volume.

2. An apparatus according to claim 1, wherein the supply container is detachably secured to a lower part with the collecting trough.

3. An apparatus according to claim 2, wherein between the lower edge of the supply container and the upper edge of the lower part seals are disposed.

4. An apparatus according to claim 3, wherein insulating seals on the basis of mineral fibres are used.

5. An apparatus according to claim 1, wherein the inner wall of the supply container comprises an inwardly projecting annular web which serves as support for the lower edge of the transport container.

6. An apparatus according to claim 1, wherein in the wall of the supply container bores with insulated electrical resistance heating elements are provided.

7. An apparatus according to claim 1, wherein the buffer volume of the lower part of the supply container is at least as large as the filling volume of the largest transport container to be handled.

8. An apparatus according to claim 1, wherein at the upper end of the supply container a cover is pivotally attached.

9. An apparatus according to claim 8, wherein at the inner side of the cover a mandrel is provided whose tip when the cover is closed penetrates into the upwardly directed face of the transport container.

10. An apparatus according to claim 8, wherein a latch means is provided for the cover.

11. An apparatus according to claim 8, wherein seals are disposed between the cover and the supply container.

12. An apparatus according to claim 1, wherein the supply container is surrounded by a heat-protecting hood.

13. An apparatus according to claim 1, wherein a conduit is provided for supplying an inert gas, in particular nitrogen, to the interior of the supply container.

* * * * *